United States Patent
Escandon et al.

(12)

(10) Patent No.: US 6,489,972 B1
(45) Date of Patent: Dec. 3, 2002

(54) DYNAMIC INTERNAL PAGE REGISTRATION AND RETRIEVAL SYSTEM

(75) Inventors: Jamie Escandon, Boise, ID (US); Cooper G. Urie, Boise, ID (US); Mark A. Fahrenkrug, Meridian, ID (US); Mark E. Hodges, Boise, ID (US); Scott D. Bonar, Meridian, ID (US); James H. Bigelow, Boise, ID (US); Chris R. Gunning, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/396,134

(22) Filed: Sep. 14, 1999

(51) Int. Cl.⁷ ............................. G06F 13/12; G06F 3/00; G06K 15/00
(52) U.S. Cl. ..................... 345/771; 345/762; 345/760; 358/1.15; 358/1.16
(58) Field of Search ................ 345/771, 970, 345/764, 965, 760, 762, 765, 809, 810, 825, 826, 841, 854, 866; 358/1.15, 1.16, 1.13, 1.1, 442, 401, 400, 501, 500

(56) References Cited

U.S. PATENT DOCUMENTS

| | | | | |
|---|---|---|---|---|
| 5,467,435 A | * | 11/1995 | Douglas et al. | 358/1.15 |
| 5,495,559 A | * | 2/1996 | Makino | 358/1.13 |
| 5,768,495 A | * | 6/1998 | Campbell et al. | 358/1.1 X |
| 6,091,508 A | * | 7/2000 | Love et al. | 358/1.15 |
| 6,133,844 A | * | 10/2000 | Ahue et al. | 358/1.15 X |
| 6,178,003 B1 | * | 1/2001 | Ha | 358/1.15 X |

OTHER PUBLICATIONS

WPI abstract Accession No. 1999–533590 and JP11–232053 A (Kiyoshi).
PAJ English abstract for JP05298041 and JP05298041 A (Akio, see abstract).
PAJ English abstract for JP63296953 and JP63296953 A (Yoshio, see abstract).

* cited by examiner

*Primary Examiner*—Raymond J. Bayerl

(57) ABSTRACT

In an imaging system including firmware and a user interface control panel, a firmware-based internal page component is capable of receiving and registering internal page data from a source external to the page component itself. The internal page component can install a control panel display menu item corresponding to the registered internal page, and then capture user control panel input relating to that page. The component can then open a data pipe, and invoke the internal page data. The data pipe can be provided in the form of a VIO channel, e.g., invoking a print job, or can involve converting internal page data to a format capable of being viewed by a web browser. The internal page component can be installed as a part of the firmware of the imaging system. Internal page data can be received from a source external to the imaging system firmware, for example, from a storage device such as a flash disk, RAM disk, or hard disk. The internal page component can be embodied as a firmware-based dynamic internal page system. The internal page system includes an internal page registration mechanism adapted and constructed to register internal pages from page sources external to the firmware of the imaging system. The internal page system also includes an internal page retrieval mechanism adapted and constructed to selectively retrieve internal pages from the page sources. A method of handling internal pages in an imaging system including firmware is also provided.

20 Claims, 2 Drawing Sheets

DYNAMIC INTERNAL PAGE REGISTRATION AND RETRIEVAL SYSTEM

FIELD OF THE INVENTION

The present invention relates to internal pages associated with imaging systems. More specifically, the present invention relates to FIRMWARE-BASED dynamic registration and retrieval of internal pages from sources external to the imaging system.

BACKGROUND OF THE INVENTION

Imaging systems such as printers, fax machines, and copiers are virtually omnipresent, and can be found in homes and offices worldwide. The development of such systems has facilitated improvements in communication that have in turn fostered an enormous change in the way people live and work. Telecommuting, paperless offices, and intra-office networks represent but a few examples of the advancements that have been made possible by modern imaging systems.

Some imaging systems, such as the HP LASERJET 8100 by Hewlett-Packard Company, use firmware as part of their operating systems. Firmware gets its name from having characteristics of both hardware and software, and is typically provided as permanent instructions embedded within ROM (read-only memory) chips, such as PROM —Programmable and ROM EPROM—Erasable Programmable ROM.

One example of a firmware-based feature in an imaging system is an "internal page". Internal pages contain information that is useful to imaging system users, such as printer configuration pages, printer network card pages, and font list pages. Typically, internal pages are permanently installed in the system firmware, and invoked by system users via the imaging system's control panel. Since the pages are part of the firmware build, it is relatively difficult to add additional internal pages or to alter existing pages. For example, if a marketing department found it desirable to generate an internal page demonstrating a new printer accessory, it would be necessary to install a special firmware build to create a special printer configuration page containing the desired information. In addition to the special build, a method of invoking the special page from the existing control panel is required. A currently known method involves installing a control panel display menu, then capturing the SELECT key press from the user keyboard input. A VIO (Virtual Input/Output) channel is opened up, and the internal page is printed.

Thus, in known systems, both a special firmware build and page-specific instructions are required to make any changes or additions to internal pages. Given the complexity and expense involved, these requirements present a significant obstacle to making otherwise desirable changes. Consequently, this potentially useful information channel is not being used to its fullest potential in existing system configurations.

It can thus be seen that the need exists for a method and apparatus for adding and retrieving internal pages that ameliorates the disadvantages of internal page alterations in known systems.

SUMMARY OF THE INVENTION

These and other objects are achieved by providing, in an imaging system including firmware and a user interface control panel, a firmware-based internal page component. The internal page component is capable of receiving and registering internal page data from a source external to the page component itself. The internal page component can install a control panel display menu item corresponding to the registered internal page, and then capture user control panel input relating to that page. The component can then open a data pipe, and invoke the internal page data. The data pipe can be provided in the form of a VIO channel, e.g., invoking a print job, or can involve converting internal page data to a format capable of being viewed by a web browser.

The internal page component can be installed as a part of the firmware of the imaging system. Internal page data can be received from a source external to the imaging system firmware, for example, from a storage device such as a flash disk, RAM disk, or hard disk.

The internal page component can be embodied as a firmware-based dynamic internal page system. The internal page system includes an internal page registration mechanism adapted and constructed to register internal pages from page sources external to the firmware of the imaging system. The internal page system also includes an internal page retrieval mechanism adapted and constructed to selectively retrieve internal pages from the page sources.

The internal page registration mechanism can be provided with the ability to create dedicated menu items in the imaging system firmware, and to receive internal page data from a source external to the imaging system firmware.

In imaging systems having a control panel including a plurality of menu items, and the internal page retrieval mechanism can be adapted and constructed to receive input from the imaging system control panel. Where the imaging system includes a job manager, and the internal page retrieval mechanism can be adapted and constructed to create a job stream in response to input from the imaging system control panel, then send the job stream to the system job manager.

A method of handling internal pages in an imaging system including firmware is also provided. The method includes the step of providing an internal page component in the imaging system firmware. The internal page component is then actuated to register at least one internal page from a page source external to the firmware of the imaging system. Next, the internal page component is actuated to selectively retrieve at least one registered internal page.

The step of actuating the internal page component to register at least one internal page can include the step of creating at least one dedicated menu item in the imaging system firmware, and that of receiving internal page data from a source external to the imaging system firmware, for example, an external storage device.

The step of actuating the internal page component to selectively retrieve at least one registered internal page can include receiving input from the imaging system control panel to select a particular registered internal page, then creating a job stream in response to input from the imaging system control panel, then sending the job stream to the system job manager.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF THE INVENTION

Figure 1:
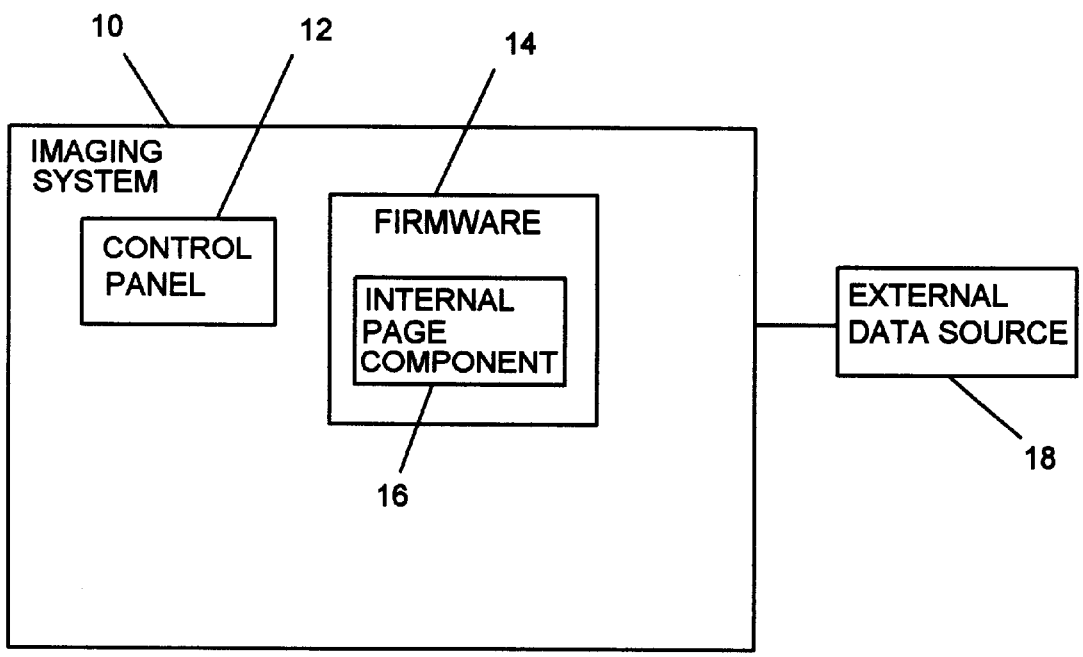
FIG. 1 is a schematic illustration of an imaging system including an internal page registration component in accordance with the principles of the present invention.

An imaging system 10 in accordance with the principles of the present invention is shown in FIG. 1. The imaging system 10 can be provided, for example, as a printer, copier, or fax machine. The illustrative examples that follow are set in the context of a LASERJET 8100 printer manufactured by Hewlett-Packard company. It will be understood, however, that the principles of the present invention are applicable to any suitable imaging system.

The imaging system 10 includes a control panel 12 which provides a user interface mechanism. The control panel 12 can be, for example, a keyboard or touchscreen as is known in the art. The control panel 12 is connected to imaging system firmware 14, which contains permanent instructions embedded within a ROM chip.

In accordance with the present invention, the imaging system firmware 14 includes an internal page component 16. The internal page component 16 is composed of a set of programming instructions, residing in the firmware 14, that allow the internal page component 16, in conjunction with the operating system of the imaging system 10 and external data source 18 (external to the imaging system firmware), to function as an internal page system. That is, implementation of the steps contained in the internal page component 16 results in an internal page registration mechanism that is adapted and constructed to register internal pages from page sources external to the a firmware of the imaging system, and an internal page retrieval mechanism adapted and constructed to selectively retrieve internal pages from the page sources.

Figure 2:
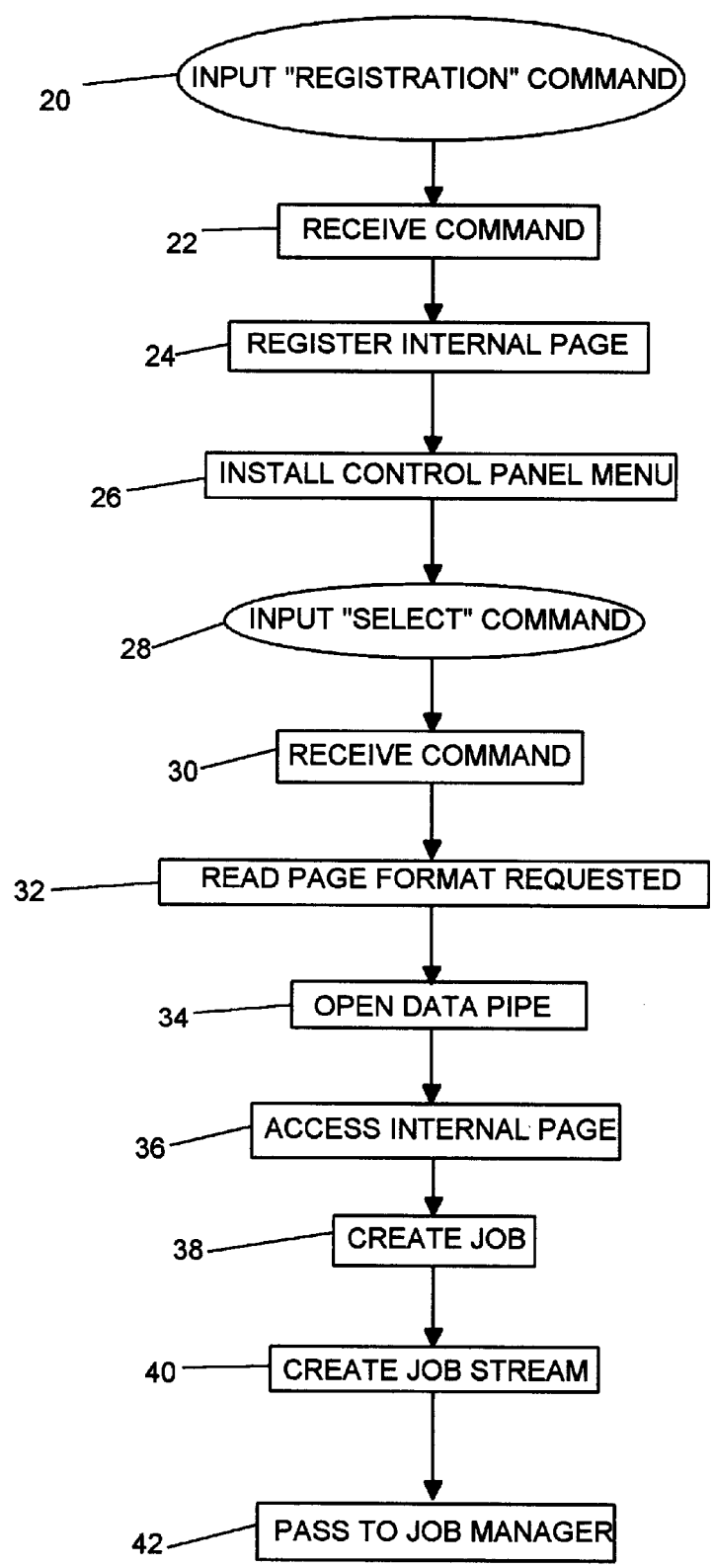
FIG. 2 is a flow chart illustrating the operation of an imaging system including an internal page registration component in accordance with the principles of the present invention.

Those of skill in the art will recognize that the specific programming used to achieve the results described herein will become apparent upon appreciation of the operational flow chart set forth in FIG. 2. The internal page registration process begins at point 20, wherein an internal page from an external source communicates with the internal page component to register itself. Such communication can be established through the operating system of the imaging system in any suitable manner, such as by modem from a remote location, or from the a storage device such as a flash disk, RAM disk, or hard disk associated with the imaging system. The internal page component receives the registration command at point 22, and proceeds at point 24 to register the internal page. Registration of the internal page involves assigning a page I.D. and installing a control panel menu item associated with the page at point 26. The internal page is now registered, and can be called up via its menu item on the control panel. The foregoing steps can be considered to make up an internal page registration mechanism.

The internal page retrieval process begins at point 28, where a system user accesses the internal page by selecting its corresponding menu item from the control panel. The internal page component receives the "select" command at point 30, and at point 32 reads the appropriate page I.D. The internal page component then opens a data pipe at point 34, through which it accesses the internal page at point 36. As will be apparent to those of skill in the art, the data pipe can be provided in the form of a VIO channel, e.g., a data pipe to facilitate invoking a print job, or can involve converting internal page data to a format capable of being viewed by a web browser.

In imaging systems, such as the LASERJET 8100, which are provided with job managers, the internal component creates a job at point 38, then creates a job stream at point 40 which is filled with the internal page data, passing the job to the job manager at point 42. The job manager then presents the job to the user in the desired format. For example, the job manager can merely invoke a print job, that is, print out the internal page data in document form. Alternatively, the job manager could convert the internal page into a format capable of being viewed by a web browser. Of course, in the absence of a job manager, it is contemplated that the internal page component would simply cause the imaging system to print the internal page, or to utilize whatever capabilities were present in the particular imaging system.

It will be appreciated that the potential applications of the present invention are many and varied. For example, advertisers could add internal pages to provide company information. In another example, manufacturers of printer accessories wishing to demonstrate their products can provide internal pages containing demo instructions in their device firmware. The accessory pages can then register themselves with the imaging system internal page component, which will create a menu item allowing system users to access the demo. Yet another example is that of imaging system customer service. The internal page component can be set up so that a customer service rep can access the imaging system to obtain needed data, such as an Error Log page, by instructing the imaging system to send the information directly to a customer service PC via a web browser. The internal page system, as set forth above, can convert internal page data into a format viewable by a web browser. Of course, such access extends to all resident and non-resident internal pages. Finally, companies operating multiple printers can track data such as printer and printer consumables usage. A standard template compiling such information can be loaded as an internal page into hard disk, and installed into each of the printers. The template can then be registered with the internal page component residing in the printer's firmware, for example, as an INVENTORY PAGE in the SERVICE MENU. When desired or at regular intervals (e.g., monthly billing), service technicians can enter the SERVICE MENU, select the PRINT INVENTORY PAGE command, and a page is printed containing information gathered.

Although the present invention has been described with reference to specific embodiments, those of skill in the art will recognize that changes may be made thereto without departing from the scope and spirit of the invention as defined by the appended claims.

What is claimed is:

1. In an imaging system including firmware and a user interface control panel, a firmware-based internal page component comprising following:

means for receiving and registering internal page data from a source external to the internal page component;

means for installing a control panel display menu item;

means for capturing user control panel input;

means for opening a data pipe; and means for invoking internal page data via the data pipe.

2. An internal page component according to claim 1, wherein the internal page component comprises a part of firmware installed in the imaging system.

3. An internal page component according to claim 1, wherein the means for receiving and registering comprises means for receiving internal page data from a source external to the imaging system firmware.

4. An internal page component according to claim 3, wherein the means for receiving and registering comprises means for receiving internal page data from a storage device.

5. An internal page component according to claim 4, wherein the means for receiving and registering comprises means for receiving internal page data from a source selected from a group consisting of flash disk, RAM disk, and hard disk.

6. An internal page component according to claim 1, wherein the means for opening a data pipe comprises means for opening a web browser, and the means for invoking internal page data comprises means for converting internal page data to a format capable of being viewed by a web browser.

7. In an imaging system including firmware and a user interface control panel, a firmware-based internal page component comprising the following:
   means for receiving and registering internal page data from a source
   external to the internal page component;
   means for installing a control panel display menu item;
   means for capturing user control panel input;
   means for opening a data pipe; and
   means for invoking a print job via the data pipe.

8. In an imaging system including firmware, a firmware-based dynamic internal page system comprising the following:
   an internal page registration mechanism adapted and constructed to register internal pages from page sources external to the firmware of the imaging system; and
   an internal page retrieval mechanism adapted and constructed to selectively retrieve internal pages from the page sources.

9. An internal page system in accordance with claim 8, wherein the internal page registration mechanism comprises means for creating dedicated menu items in the imaging system firmware.

10. An internal page system according to claim 8, wherein the internal page registration mechanism is adapted and constructed to receive internal page data from a source external to the imaging system firmware.

11. An internal page system according to claim 10, wherein the internal page registration mechanism is adapted and constructed to receive internal page data from a storage device.

12. An internal page system according to claim 11, wherein the internal page registration mechanism is adapted and constructed to receive internal page data from a source selected from a group consisting of flash disk, RAM disk, and hard disk.

13. An internal page system according to claim 8, wherein the imaging system comprises a control panel including a plurality of menu items, and the internal page retrieval mechanism is adapted and constructed to receive input from the imaging system control panel.

14. In an imaging system including firmware, a control panel having a plurality of menu items, and a job manager, a firmware-based dynamic internal page system comprising the following:
   an internal page registration mechanism adapted and constructed to register internal pages from page sources external to the firmware of the imaging system; and
   an internal page retrieval mechanism adapted and constructed to selectively retrieve internal pages from the page sources, create a job stream in response to input from the imaging system control panel, then send the job stream to the system job manager.

15. In an imaging system including firmware, a method of handling internal pages, the method comprising the following steps:
   providing an internal page component in the imaging system firmware;
   actuating the internal page component to register at least one internal page from a page source external to the firmware of the imaging system; and
   actuating the internal page component to selectively retrieve at least one registered internal page.

16. A method according to claim 15, wherein the step of actuating the internal page component to register at least one internal page comprises creating at least one dedicated menu item in the imaging system firmware.

17. A method according to claim 15, wherein the step of actuating the internal page component to register at least one internal page comprises receiving internal page data from a source external to the imaging system firmware.

18. A method according to claim 17, wherein the step of actuating the internal page component to register at least one internal page comprises receiving internal page data from a storage device.

19. A method according to claim 15, wherein the imaging system comprises a control panel including a plurality of menu items, and the step of actuating the internal page component to selectively retrieve at least one registered internal page comprises receiving input from the imaging system control panel to select a particular registered internal page.

20. In an imaging system including firmware, a control panel including a plurality of menu items, and a job manager, a method of handling internal pages, the method comprising the following steps:
   providing an internal page component in the imaging system firmware;
   actuating the internal page component to register at least one internal page from a page source external to the firmware of the imaging system; and
   actuating the internal page component to selectively retrieve at least one registered internal page by receiving input from the imaging system control panel to select a particular registered internal page and create a job stream in response to input from the imaging system control panel, then send the job stream to the system job manager.

* * * * *